Patented May 1, 1945

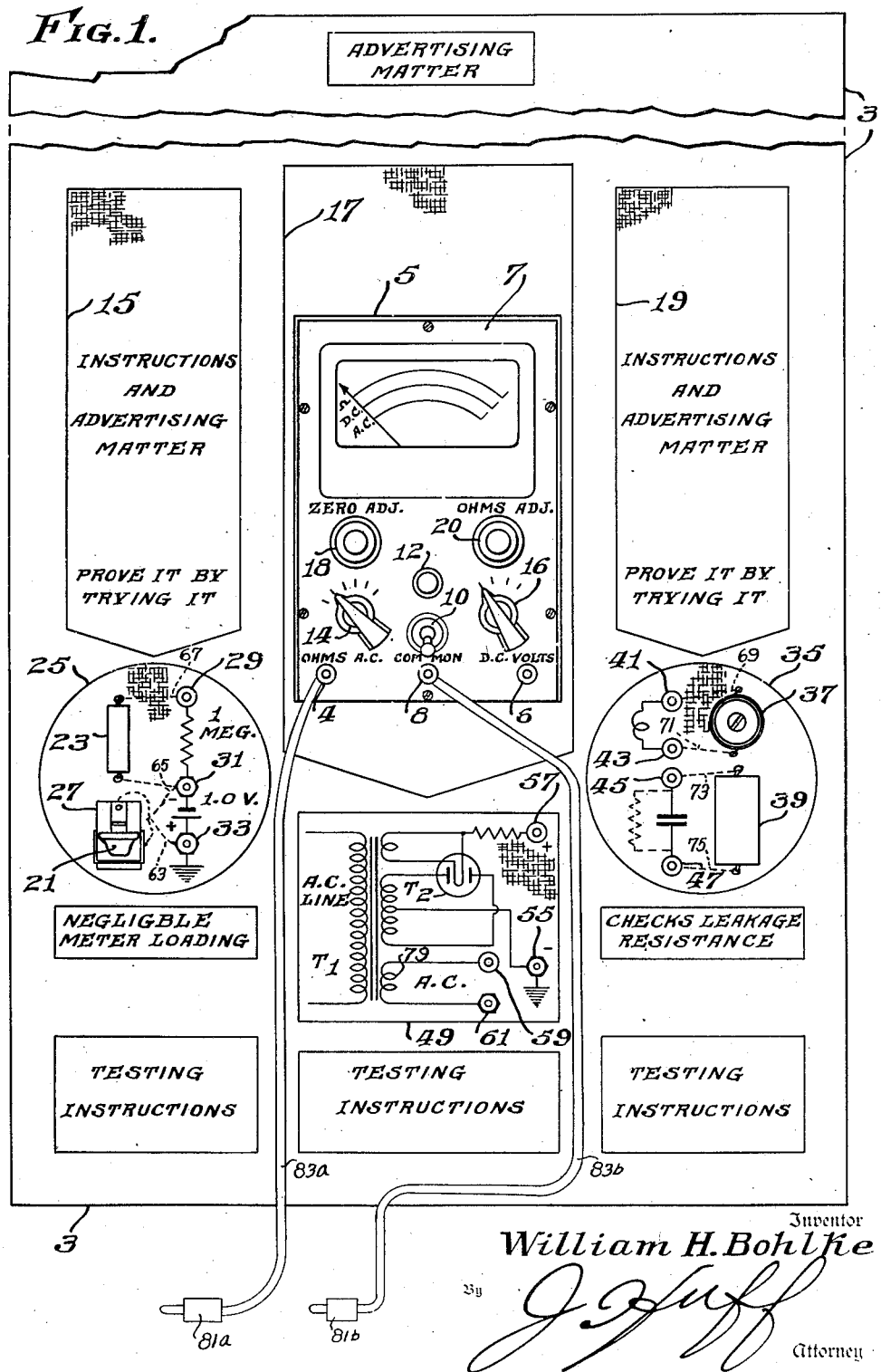

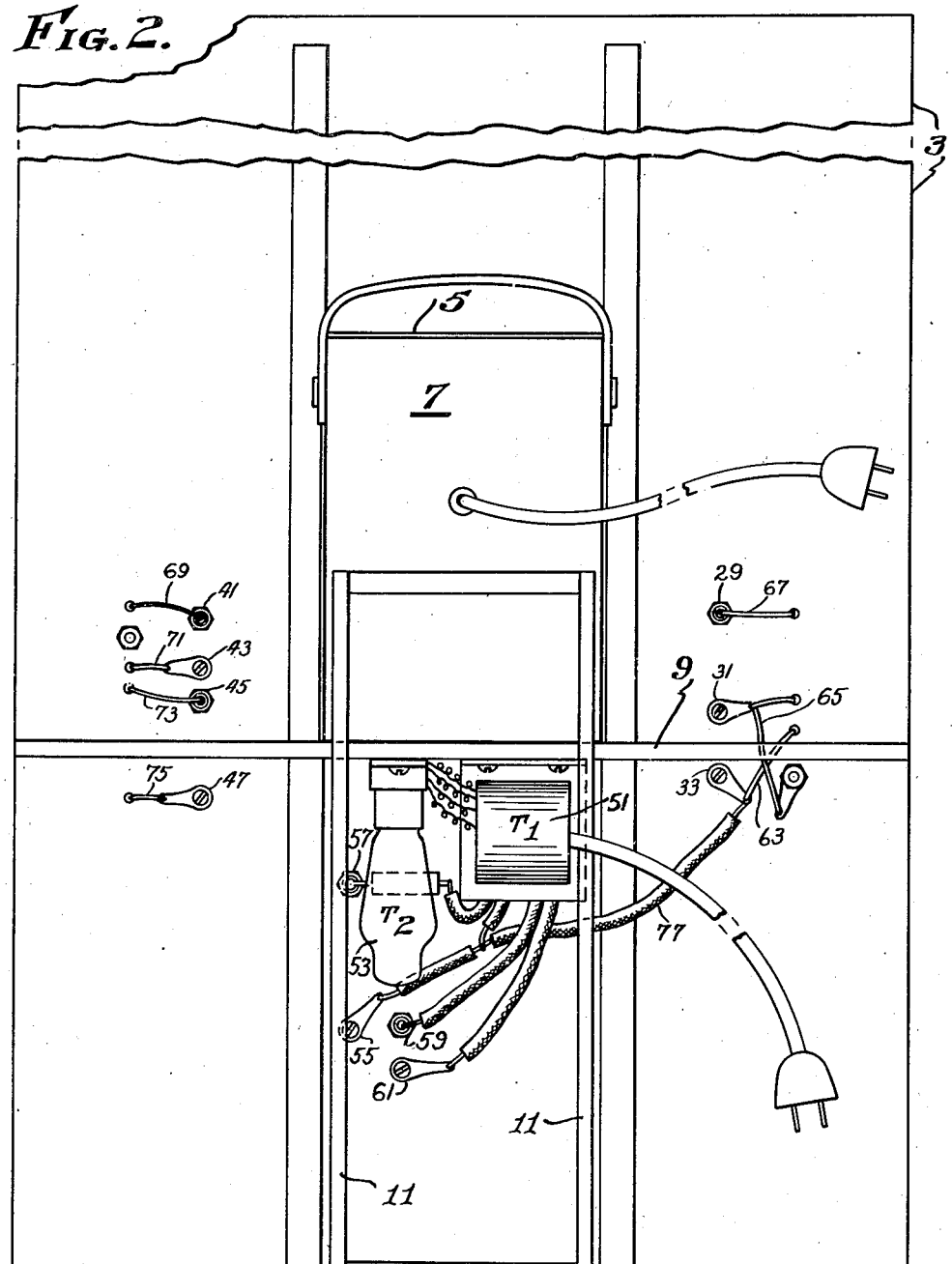

2,374,800

UNITED STATES PATENT OFFICE 2,374,800

DISPLAY DEVICE

William H. Bohlke, Oaklyn, N. J., assignor to Radio Corporation of America, a corporation of Delaware Application November 30, 1940, Serial No. 367,899

2 Claims. (Cl. 35—13)

This invention relates to advertising display devices, and has for its principal object the provision of an advertising display particularly adapted to promote the sale of electrical measuring devices.

The invention will be described in its application to a vacuum tube volt-ohmmeter, but may be employed to equal advantage in connection with many other types of measuring instruments, particularly those which may be used to make a number of different types of measurements throughout a wide range of values. The volt-ohmmeter is typical of this class of instruments since it combines in one instrument, for example, an indicator for measuring direct current voltages from zero to 1000 volts, alternating voltages from 0 to 1000 volts, and values of resistance from zero up to several hundred or even a thousand megohms.

Of prime importance to the prospective purchaser of such instrument is its accuracy, and this involves not only the accuracy of calibration at given points, but also its "readability," which, in turn, depends on the linearity of the indicator scale, the number of separate voltage or resistance ranges used. The prospective purchaser also wants to know the sensitivity and range of the instrument. He will ask how small a voltage will it measure? For instance, can it measure the voltage of a bias cell? Can it be used to measure, say, the resistance of a coil? Can the leakage resistance of a capacitor or insulating material be measured? The prospective purchaser will also know that the input impedance of the instrument must be extremely high, particularly where it is to be used in testing radio circuits, since it is well known that an accurate measurement can be made only when the impedance of the measuring instrument is high with respect to that of the source across which the voltage appears.

The instrument being advertised may also have other advantages which may not occur to the prospective customer. For example, the instrument may include inherent protection or special protective circuits such that the meter cannot be damaged upon application of a voltage far in excess of that for which the instrument is set. Thus, if the range selector is set for the measurement of voltages from 0–3 volts, and 300 volts, for example, is accidentally applied, will the instrument be damaged or will the protection afforded automatically prevent injury?

These typical questions, and others, are, of course, answered by any printed advertising matter used to promote the sale of the instrument. In accordance with the present invention, however, an advertising display is proposed which not only points out the advantage and features of the instrument, but also makes possible an actual personal—a try it yourself type—demonstration which will convince the customer of the advantages of the instrument. Thus, each display in the distributor's and/or dealer's show room advertising the volt-ohmmeter, for example, has mounted thereon and connected to convenient terminals, various electrical elements including resistors, capacitors, inductors, and sources of direct and alternating voltage so that tests may be made in accordance with printed instructions—a part of the display—which demonstrate vividly the actual operation of the instrument.

This invention will be better understood from the following description when considered in connection with the accompanying drawings in which Figure 1 is a front view of an advertising display, and Figure 2 is a rear view of the same display. Similar reference numerals refer to similar elements throughout the several figures of the drawings.

Referring to the figures, reference numeral 3 is, for example, a plywood, metal or heavy cardboard panel having a conveniently located aperture 5 which is cut out so as to receive the volt-ohmmeter 7, or other instrument. The instrument 7 which may be heavier than an ordinary meter is supported in the aperture 5 so that its face is approximately flush with the panel by means of a shelf 9 extending rearwardly from the panel. The shelf and panel are supported by one or more supporting members 11 which are at right angles to the panel and to which the panel and shelf are fastened.

Suitable advertising matter is printed on the face of the panel. To make a pleasing symmetrical arrangement, this matter may be within distinctively colored sections 15, 17, and 19, for example. Thus, the features of the instrument for measuring D.-C. voltage are listed in section 15 immediately above the circuit elements provided for proving them. The features relating to the measurement of resistance are set forth in section 19 immediately above the circuit element provided for proving these features.

While the volt-ohmmeter 7, per se, is not a part of the present invention, it will be described briefly. Three input terminals are provided, one, 4, for use when measuring resistance and alternating current, a second, 6, for use when measuring direct current voltages, and a third, 8, common to both. The common input terminal 8 is connected to the case of the volt-ohmmeter and therefore to ground. A toggle switch 10 turns the instrument on, and a pilot light 12 indicates that the device is operating.

Two selector switches are provided, the first, 14, being a conventional attenuator or "multiplier" switch provided with a suitable scale indicating the multiplication factor to be used in determining the actual voltage or resistance from the meter reading, and the other, 16, being used to select the type of measurement to be made, such as ohms, A.-C. volts, or D.-C. volts. Two positions for the latter measurement are provided, one marked "+ volts" and the other "— volts," which effectively reverse the input connections, thus making it unnecessary to change the test prods when the meter reads backwards due to improper polarization. Potentiometer controls 18 and 20 are provided for the adjustment of the meter zero for the voltage and resistance scales, respectively.

Below the instrument a small battery 21 of the "bias cell" type and a 1 megohm resistor 23 are mounted within a distinctively colored section 25. The leads from the bias cell holder 27 and the resistor are connected to terminals 29, 31 and 33, preferably by connections at the rear of the panel. One lead 63 from the bias cell is connected to the lower terminal 33, the other 65 to the terminal 31 to which one end of the resistor is also connected by a lead 67. The remaining terminal 29 is connected to the other end of resistor 23.

The standard electrical symbols for a battery and a resistor are printed on the panel between the terminals to which the corresponding elements are actually connected to help the customer to visualize the relation of the elements to a schematic circuit.

In another suitably colored section 35, a coil 37 and a paper roll capacitor 39 are mounted. These elements are connected to corresponding terminals 41, 43, 45, and 47, preferably by leads 69 and 71, and 73 and 75, respectively at the rear of the panel. As before, schematic symbols for the coil and capacitor are printed on the panel to show their actual connection.

Still another suitably colored section 49 contains the circuit diagram of a transformer and rectifier connected in a rectifying circuit. The actual transformer 51 and rectifier tube 53 may be mounted on the front or rear of the panel, the latter case being illustrated. Terminals 55 and 57 are provided on the panel and connected to ground and the positive high voltage source, respectively. The transformer 51 includes a low voltage winding 79 (shown in the circuit diagram on the front of the panel in Figure 1) which is connected to a pair of terminals 59, 61.

The terminals connected to the "hot" or high voltage circuits are preferably insulated pin jacks to which connection can only be made by probes 81a, 81b supplied with the instrument and connected thereto by leads 83a, 83b. The other terminals may be any convenient type of lug, bolt or jack.

The display panel and instrument are placed so as to be available to the prospective customer. By suitable words on the panel he is invited to try it for himself, and specific directions are printed and suitably located on display for making various tests which demonstrate the merits of the instrument. For example, he is directed to check the input impedance by measuring the voltage of the cell 21 by connecting the instrument leads directly across the cell terminals 31, 33, noting the voltage with the instrument set on the proper scale, and then measuring the voltage through the 1 megohm resistor 23 by connecting the test prod to terminal 29. If the voltage is the same as before, or substantially so, he will be convinced that the input impedance of the instrument as a voltmeter is very high as compared to that of the resistor.

The prospective customer may also be directed to test the resistance measuring ability of the instrument by measuring the very low resistance of the coil 37, and the very high resistance due to the leakage in capacitor 39. A permanent leakage value may be secured by assembling a very high carbon resistor or resistors within the capacitor roll. The A.-C. range and the high D.-C. range may also be checked by touching or plugging in of the proper test prods to the proper terminals of the rectifier. He may then be directed to set the selector switch of the meter at the most sensitive position and touch the test prod to the high voltage terminal. If the instrument meter is as claimed, of course, if will not be damaged, although the needle will undoubtedly be deflected off scale. To make necessary moving only one test prod, a common ground lead 77 ties terminal 33 with terminal 55.

Actual operating demonstrations are far more convincing than mere claims. Other tests may be made, of course, to demonstrate other features, the nature of the demonstration being determined by the nature and capabilities of the instrument. For example, a paritial or complete radio circuit may be provided, including radio frequency and audio frequency voltages to demonstrate the frequency range of the instrument and its utility in testing radio receivers. Cathode ray oscillographs, Wheatstone bridges, frequency meters, signal tracing equipment and other measuring and indicating devices may be advertised similarly by providing operating tests in conjunction with instructions and sales promotional data. The prospective customer reaction is far more favorable than that obtained by sales talk and printed matter alone, since the customer may inspect the instrument at his leisure, and make tests himself which will be more convincing than mere claims.

I claim as my invention:

1. An advertising display for a volt-ohmmeter comprising a panel having an aperture therein, a rearwardly extending bracket for supporting said meter within said aperture, a plurality of different electrical circuit elements mounted on said panel, schematic representations on the face of said panel of the electrical characteristics of said elements, terminals on the face of said panel at appropriate points on said schematic representations, electrical connections from said terminals to corresponding points on the corresponding electrical elements, and flexible leads connected to said meter for making connection to any one of said elements whereby said meter may be tested readily by measuring the properties of said elements.

2. An advertising display for a volt-ohmmeter comprising a display panel, means for mounting said bolt-ohmmeter on said panel, a bracket for supporting the volt-ohmmeter, a source of low voltage direct current and a high impedance serially connected and mounted on said panel, terminals for making electrical connection to said source and said impedance, a source of alternating current of selectable voltage mounted on said panel and terminals for connection to said source whereby the operation of said volt-ohmmeter may be tested, and schematic representations on the face of said panel adjacent to each of said terminals indicating the electrical characteristics of the apparatus connected thereto, the position of the schematic representations in relation to said terminals corresponding to the relation of said electrical elements to said terminals.

WILLIAM H. BOHLKE.